N. FRANZEN.
APPARATUS FOR ROLLING PLASTIC MATERIAL.
APPLICATION FILED JUNE 14, 1909.

945,319.

Patented Jan. 4, 1910.
2 SHEETS—SHEET 1.

WITNESSES:
J. Herbert Bradley.
Charles Barrett

INVENTOR
Nicklas Franzen
by Christy and Christy
Att'ys

N. FRANZEN.
APPARATUS FOR ROLLING PLASTIC MATERIAL.
APPLICATION FILED JUNE 14, 1909.

945,319.

Patented Jan. 4, 1910.
2 SHEETS—SHEET 2.

WITNESSES:
J. Herbert Bradley.
Charles Barnett.

INVENTOR
Nicklas Franzen
by Christy and Christy
Atty's

UNITED STATES PATENT OFFICE.

NICKLAS FRANZEN, OF WALTON, PENNSYLVANIA.

APPARATUS FOR ROLLING PLASTIC MATERIAL.

945,319.  Specification of Letters Patent.  Patented Jan. 4, 1910.

Application filed June 14, 1909. Serial No. 502,062.

*To all whom it may concern:*

Be it known that I, NICKLAS FRANZEN, residing at Walton, in the county of Allegheny and State of Pennsylvania, a citizen of the United States, have invented or discovered certain new and useful Improvements in Apparatus for Rolling Plastic Material, of which improvements the following is a specification.

My invention relates to improvements in machinery for rolling plastic material and specifically to machinery for the rolling of glass in heated condition, and the object of my improvement concerns the adjustment of the members of the rolling mechanism and spacing them one from another that layers of different desired thicknesses may be produced.

Figure 1:
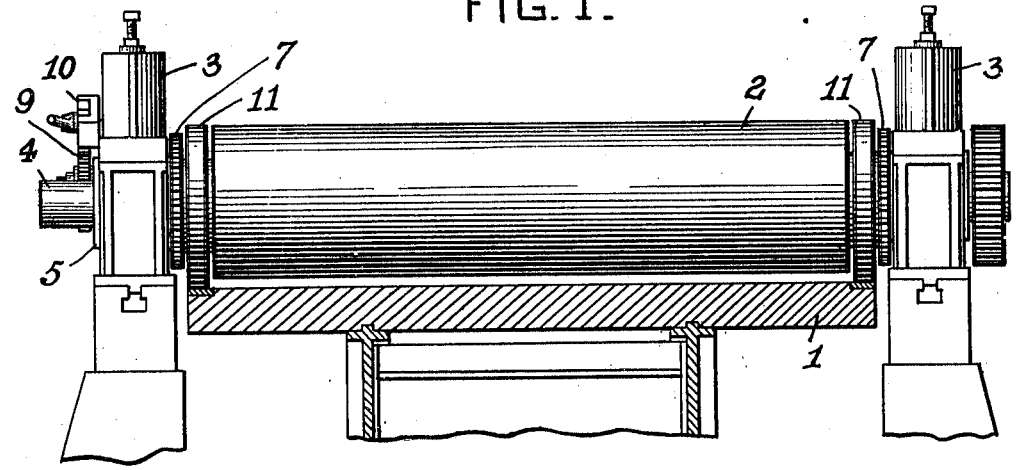
Figure 2:
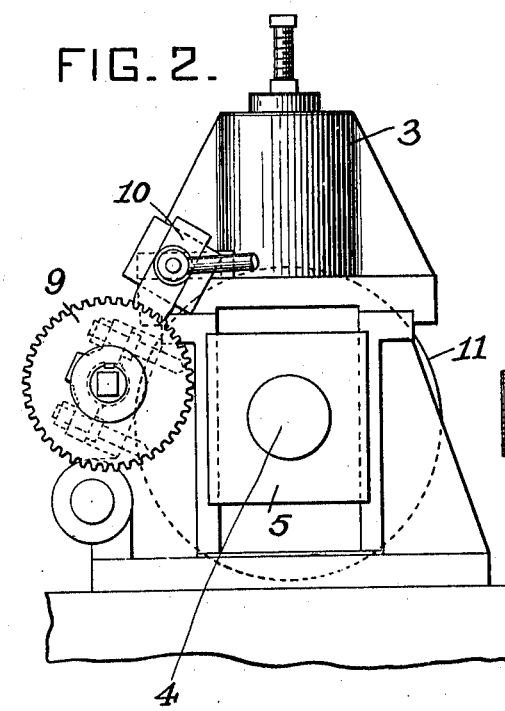
Figure 3:
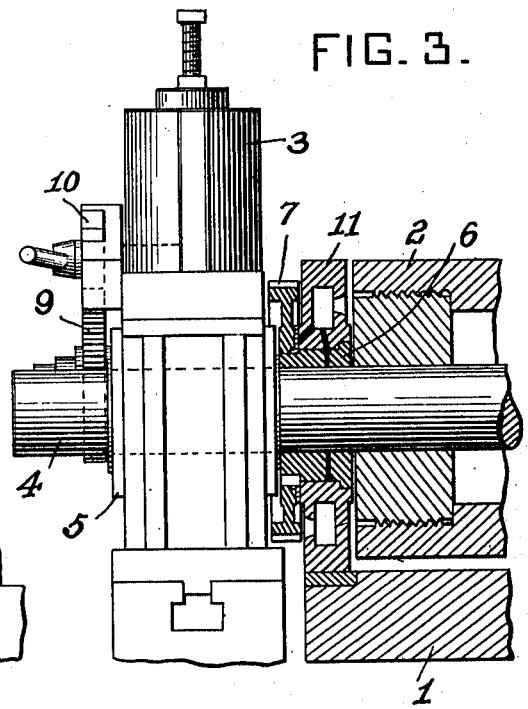
Figure 4:
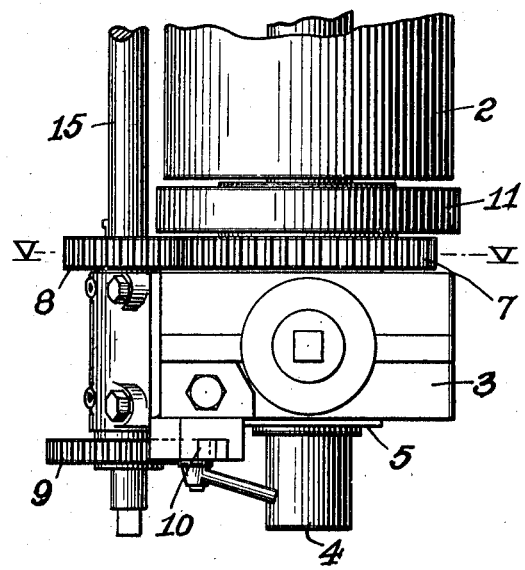
Figure 5:
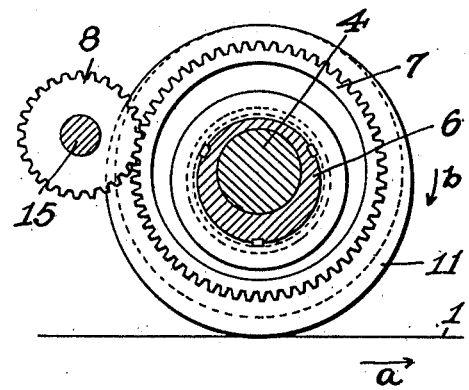
Figure 6:
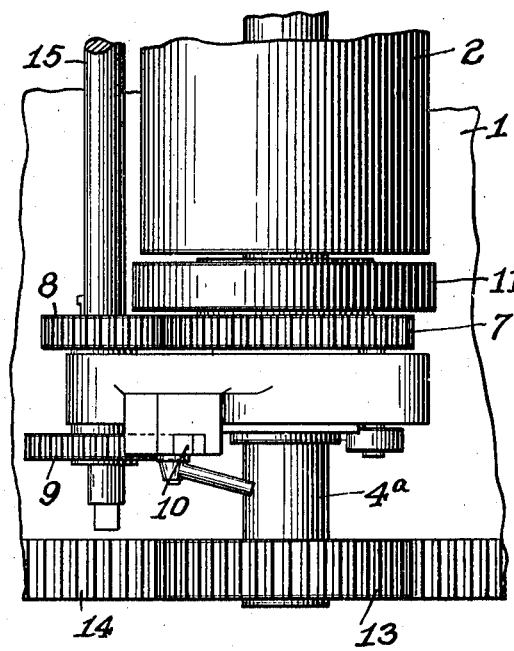
Figure 7:
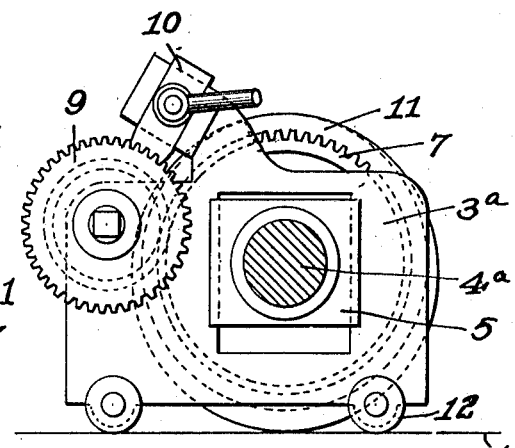
Figure 8:
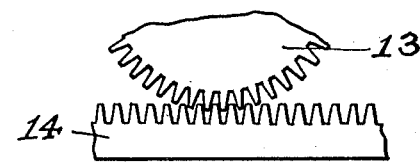

In the accompanying drawings which illustrate my invention Figure 1 shows the essential parts of a machine for rolling molten or plastic glass in which my invention is embodied, the casting table of the machine and its support are shown in section, the remaining parts in elevation. Fig. 2 is a view on a larger scale and in side elevation of the housings of the spreading roll shown in Fig. 1; Fig. 3 is the front elevation of the housing shown in Fig. 2, the roll and the table being there shown in section; Fig. 4 is a plan view of what was shown in Figs. 2 and 3; Fig. 5 is a view in cross section in the line V—V of Fig. 4; Figs. 6, 7 and 8 illustrate a modification of the machine from the typical form of Figs. 1 to 5, Fig. 6 being a view similar to Fig. 4, Fig. 7 a view similar to Fig. 2, and Fig. 8 a detail peculiar to the modified form, the parts there shown being in elevation.

Parts which are repeated in the several figures bear the same reference numerals in each case.

My invention is here shown applied to an ordinary glass-rolling machine, but it will be understood that it is applicable generally to machines in which plastic materials in general are spread to layer form.

In these drawings 1 indicates a casting surface, 2 a spreading roll, and in the normal operation of such machine these two parts coöperate to spread upon the casting surface a batch of molten glass to layer form. To this end the casting surface is preferably a horizontally extending table top, and the casting roll extends transversely above it, parallel to it, and at a slight elevation from it, so that the pass between the roll and the table top determines the thickness of the layer which is spread.

In the machine illustrated in Figs. 1 to 5 inclusive, the roll itself is mounted to rotate in stationary housings and has no motion of translation, but the table top 1 moves to and fro beneath it to effect the spreading of the glass. In the machine of Figs. 6, 7, and 8, on the other hand, it will be understood that the table itself is stationary and the roll traverses the table from end to end, to effect the spreading of the glass.

As has been stated above, it is the width of the pass between the roll and the surface of the casting table which determines the thickness of the layer spread in the operation of the machine, and my present invention is particularly directed to an adjustment such that the width of this space may within permissible limits be varied as desired. It has heretofore been common practice to determine the width of this space by the use of collars upon the roll or by tracks or trangs upon the table top, whose thickness determines the width of the space, but these devices have their practical drawbacks, because in order to vary the width of the space there must be a number of interchangeable collars or tracks of different thicknesses. By my improvement this determination of the distance of the roll from the table top is effected in the housing which carries the roll. This housing is illustrated in the drawings (and I here direct attention to the type form of Figs. 1 to 5) at 3, and is in general form an arrangement of ordinary and useful construction. This housing carries the shaft 4 of the roll, which passes through the pillow block 5, vertically adjustable within the housing in well known manner.

Upon the shaft 4 of the roll 2 and adjacent to the housing 3 is a bushing 6, and this bushing 6 is keyed to a toothed wheel 7 and the toothed wheel 7, rotatable with the bushing 6 upon the shaft 4, is secured in rigid postion by a locking member carried by the housing. My preferred form of locking member consists of a pair of toothed wheels 8 and 9 mounted on a common axle which turns in suitable bearings formed in or on the housing, one of said toothed wheels 8 meshing with the aforesaid toothed wheel 7 and the other toothed wheel 9 being engaged by a toothed block 10 carried in the housing. This toothed block 10 may be withdrawn and the gear wheels turned to bring the wheel 7 with its bushing 6 to the desired position, and when brought to the desired position the block 10 may be advanced to engage the teeth of the gear wheel 9 and being secured in such engagement, the whole is locked against any movement.

Returning now to the bushing 6 which surrounds the shaft 4 of the roll 2 and to which the toothed wheel 7 is keyed as above described, this bushing in turn serves as an axle for the sheave 11, and to that end it is externally truly circular in form. But the inner and outer bearing surfaces of this sleeve 6 are eccentric, one to the other, and in consequence the distance between the centers of rotation of the roll 2 and of the sheave 11 may be caused to vary from a minimum to a maximum within the limits which the particular dimensions of the parts permit. The sheave 11, turning upon sleeve 6 as an axle, rests upon the margin of the table 1 and supports the roll in position, and, as the machine operates, it rolls upon the surface of the table, maintaining the roll 2 at the desired interval above the table top. The relative movement of these parts will be clearly understood by comparing Fig. 3 and Fig. 5. In Fig. 5 the sleeve 6 will be seen clearly to be of eccentric form and in that figure also are shown the keys which secure this eccentric sleeve 6 to the pinion 7. Now if it be remembered that this eccentric 6 has no motion of rotation whatever while the machine is operated, and that the axle 4 of the roll 2 turns within the eccentric sleeve 6 and that the sheave 11 turns upon the outer surface of the eccentric sleeve 6, the arrangement will be understood. As the table travels in the direction indicated by the arrow $a$ in Fig. 5, the sheave 11 will roll upon the edges of the table in the direction indicated by the arrow $b$, and as it rolls it will maintain the eccentric sleeve 6 in definite spaced relation to the table top, and thereby the roll body 2, which rotates within the eccentric sleeve 6, will likewise be maintained at a definite and predetermined interval above the surface of the table 1.

In order to alter the position of roll 2 above the table 1 it is necessary to withdraw the block 10 from engagement with the gear wheel 9. When the block is withdrawn the gear wheel 9 may be turned and in its turning, gear wheel 8 is turned and gear wheel 7 is turned and the sleeve 6 is turned, and as the sleeve 6 turns, the bearing within it, in which the axle of the roll 2 is carried, is caused to approach nearer to or to rise farther from the surface of the table 1, and when the roll is thus brought to the desired distance above the table 1, the block 10 is again applied to lock the parts in that desired position.

I provide a sleeve 6 and a sheave 11 at each end of roll 2, but I preferably move both sleeves 6 in unison. To this end, the two toothed wheels 7 to which the two sleeves 6 are keyed are mounted on a common shaft, 15, which extends from side to side across the machine, and a single operating and locking device, such as I have already described, is employed for both, and is as the drawings show carried by one of the opposite housings of roll 2.

Coming now to the modification which is shown in Figs. 6, 7 and 8, it will be found to lie in an adaptation of this adjusting mechanism to a machine in which the table is stationary and the casting roll travels. In this case, the housing, marked $3^a$ travels upon rollers 12 on the surface of the casting table 1, and in order that the casting roll 2 shall be caused to rotate as it advances, the shaft 4 of the roll 2 is prolonged beyond its housing, as is indicated at $4^a$ and is provided at its extremity with a toothed wheel 13, which engages a rack 14 lying along the table and parallel with it. It will be understood that, in consequence of the adjustment of the roll for spreading layers of glass of different thicknesses, it is necessary that there be some vertical play in the engagement of the gear wheel 13 with its track 14, and to this end the teeth in the gear wheel and the cogs of the track are of the well known involute form.

I claim herein as my invention:

1. In a machine for spreading plastic material to layer form, the combination with a casting surface and spreading roll of a sleeve forming the bearing for the journal of the roll and a sheave journaled upon said sleeve and engaging the casting surface, the inner and outer bearing surfaces of the said sleeve being eccentric one to the other, substantially as described.

2. In a machine for spreading plastic material to layer form, the combination with a casting surface and spreading roll of a sleeve forming the bearing for the journal of the roll and a sheave journaled upon said sleeve and engaging the casting surface, the inner and outer bearing surfaces of the said sleeve being eccentric one to the other, and means for shifting the position of said sleeve, substantially as described.

3. In a machine for spreading plastic material to layer form, the combination of a casting surface, a roll a sleeve forming the bearing for the journal of the roll and upon which a spacing sheave is mounted to rotate, the inner and outer bearing surfaces of said sleeve being eccentric, and said sleeve being carried by a rotatable toothed wheel, and means for locking said toothed wheel at a desired point in the range of its rotation, substantially as described.

4. In a machine for spreading plastic material to layer form, the combination of a casting table, a roll carried in housings adapted to traverse the surface of the table from end to end, the shaft of said roll being provided with a toothed wheel and a track extending parallel with the table and engaging said toothed wheel to cause the roll to rotate as it advances, together with a sleeve forming the bearing for the journal of the roll and upon which a spacing sheave is journaled, the inner and outer bearing surfaces of said sleeve being eccentric one to the other, and said spacing sheave engaging the surface of the table, substantially as described.

In testimony whereof, I have hereunto set my hand.

NICKLAS FRANZEN.

Witnesses:
FRIEDA E. WOLFF,
CHARLES BARNETT.